United States Patent
Mijanovic et al.

(10) Patent No.: US 9,297,548 B2
(45) Date of Patent: Mar. 29, 2016

(54) CONTROL OF MULTIPLE ZONE REFRIGERANT VAPOR COMPRESSION SYSTEMS

(75) Inventors: Stevo Mijanovic, South Windsor, CT (US); Olawale Adetona, East Hartford, CT (US); Futao Zhao, South Windsor, CT (US); Robert Bitmead, San Diego, CA (US); Ruello Rubino, St. Didier de Formans (FR); JeanPhilippe Goux, Toussieu (FR); Fabienne Peyaud, Saint Pierre de Chandieu (FR); Fengcheng Sun, Shanghai (CN); Lishan Wang, Shanghai (CN)

(73) Assignee: CARRIER CORPORATION, Farmington, CT (US)

( * ) Notice: Subject to any disclaimer, the term of this patent is extended or adjusted under 35 U.S.C. 154(b) by 1367 days.

(21) Appl. No.: 13/126,296

(22) PCT Filed: Oct. 21, 2009

(86) PCT No.: PCT/US2009/061459
§ 371 (c)(1),
(2), (4) Date: Apr. 27, 2011

(87) PCT Pub. No.: WO2010/051198
PCT Pub. Date: May 6, 2010

(65) Prior Publication Data
US 2011/0209490 A1 Sep. 1, 2011

Related U.S. Application Data

(60) Provisional application No. 61/110,137, filed on Oct. 31, 2008.

(51) Int. Cl.
*B60H 1/32* (2006.01)
*F24F 11/00* (2006.01)
(Continued)

(52) U.S. Cl.
CPC .......... *F24F 11/008* (2013.01); *B60H 1/00885* (2013.01); *B60H 1/323* (2013.01);
(Continued)

(58) Field of Classification Search
CPC ................ B60H 1/323; B60H 2001/00942; B60H 2001/00949; B60P 3/20; F25B 5/02; F25B 2600/2511
USPC ............ 236/1 B, 1 C; 62/203, 204, 205, 216, 62/228.4, 441, 442
See application file for complete search history.

(56) References Cited

U.S. PATENT DOCUMENTS 4,487,028 A * 12/1984 Foye .............................. 62/115
5,197,293 A * 3/1993 Okamura et al. ............ 62/228.4
(Continued)

FOREIGN PATENT DOCUMENTS

FR 2912084 8/2008
JP 2003247742 5/2003

OTHER PUBLICATIONS

International Preliminary Report on Patentability mailed May 12, 2011.
International Search Report and Written Opinion mailed Jun. 7, 2010.

*Primary Examiner* — Jonathan Bradford
(74) *Attorney, Agent, or Firm* — Cantor Colburn LLP

(57) ABSTRACT

A refrigerant vapor compression system and a method of controlling the system are adapted for controlling the distribution of cooling capacity between two or more temperature controlled zones.

10 Claims, 4 Drawing Sheets

(51) Int. Cl.
*B60H 1/00* (2006.01)
*F25B 5/02* (2006.01)
*F25D 29/00* (2006.01)

(52) U.S. Cl.
CPC ............... *F25B 5/02* (2013.01); *B60H 1/3232* (2013.01); *B60H 2001/00942* (2013.01); *B60H 2001/3272* (2013.01); *F24F 11/0012* (2013.01); *F25B 2400/22* (2013.01); *F25B 2500/19* (2013.01); *F25B 2600/0253* (2013.01); *F25B 2600/2511* (2013.01); *F25B 2600/2521* (2013.01); *F25B 2700/21172* (2013.01); *F25D 29/003* (2013.01)

(56) References Cited

U.S. PATENT DOCUMENTS

| | | | | |
|---|---|---|---|---|
| 5,343,935 | A | * | 9/1994 | Sumitani ..................... 165/207 |
| 6,102,114 | A | * | 8/2000 | Nishihara et al. ............ 165/207 |
| 6,357,248 | B1 | * | 3/2002 | Bongaards et al. ............. 62/263 |
| 6,415,619 | B1 | | 7/2002 | Bash et al. |
| 6,981,381 | B1 | * | 1/2006 | Wang et al. ..................... 62/3.2 |
| 2002/0134095 | A1 | * | 9/2002 | Temmyo et al. ................ 62/179 |
| 2002/0157820 | A1 | | 10/2002 | Beitelmal et al. |
| 2003/0051494 | A1 | | 3/2003 | Ohya |
| 2007/0240440 | A1 | * | 10/2007 | Sunderland .................. 62/228.3 |
| 2008/0030155 | A1 | * | 2/2008 | Patel et al. ............... 318/400.02 |

* cited by examiner

CONTROL OF MULTIPLE ZONE REFRIGERANT VAPOR COMPRESSION SYSTEMS

CROSS-REFERENCE TO RELATED APPLICATION

Reference is made to and this application claims priority from and the benefit of U.S. Provisional Application Ser. No. 61/110,137, filed Oct. 31, 2008, and entitled CONTROL OF MULTIPLE ZONE REFRIGERANT VAPOR COMPRESSION SYSTEMS.

FIELD OF THE INVENTION

This invention relates generally to refrigerant vapor compression systems and, more particularly, to a method for controlling the operation of a refrigerant vapor compression system associated with a climate controlled space having at least two temperature controlled zones.

BACKGROUND OF THE INVENTION

Refrigerant vapor compression systems are well known in the art and are commonly used for conditioning air to be supplied to a climate controlled comfort zone within a residence, office building, hospital, school, restaurant or other facility. Refrigerant vapor compression systems are also commonly used in refrigerating air supplied to display cases, merchandisers, freezer cabinets, cold rooms or other perishable/frozen product storage area in commercial establishments.

Refrigerant vapor compression systems are also commonly used in transport refrigeration systems for refrigerating air supplied to a temperature controlled cargo space of a truck, trailer, container or the like for transporting perishable/frozen items by truck, rail, ship or intermodally. Refrigerant vapor compression systems used in connection with transport refrigeration systems are generally subject to more stringent operating conditions due to the wide range of operating load conditions and the wide range of outdoor ambient conditions over which the refrigerant vapor compression system must operate to maintain product within the cargo space at a desired temperature. The desired temperature at which the cargo needs to be controlled can also vary over a wide range depending on the nature of cargo to be preserved. The refrigerant vapor compression system must not only have sufficient capacity and refrigerant charge to rapidly pull down the temperature of product loaded into the cargo space at ambient temperature, but also operate efficiently at low load with excess refrigerant charge when maintaining a stable product temperature during transport.

In transport refrigeration applications, the refrigerant vapor compression system needs to generate sufficient cooling to chill the cargo space to a preselected set point temperature. For perishable food products, the cargo space would be cooled to a set point temperature of slightly above 0° C. (32° F.) to as high as about 30° C. (86° F.), depending upon the particular perishable food product being transported. However, for frozen food products, the cargo space would be cooled to a set point temperature below 0° C. (32° F.) to as low as −20° C. (−4° F.) or lower, depending upon the particular frozen food product being transported. Due to this wide range of product temperature requirements, the cargo space of a truck, trailer, container or the like is typically a single compartment housing either a perishable product, such as fruits or vegetables, or a frozen product, such as meat or seafood products. Therefore, most refrigerant vapor compression systems are simply controlled in response to a single set point temperature.

SUMMARY OF THE INVENTION

In an aspect of the invention, a method is provided for controlling the operation of a refrigerant vapor compression system for cooling a temperature-controlled space having a plurality of temperature controlled zones. The refrigerant vapor compression system includes a refrigerant circuit through which a refrigerant mass flow is circulated by a compression device. The method includes the steps of: controlling the refrigerant mass flow through the refrigerant circuit to provide a cooling capacity of the refrigerant vapor compression system in response to a collective cooling demand for said plurality of temperature controlled zones; and selectively dividing the refrigerant mass flow amongst the plurality of temperature controlled zones. The method may further include the step of estimating the cooling demand of each respective zone of the plurality of temperature controlled zones as a function of a difference between a sensed temperature and a related set point temperature associated with each respective zone of the plurality of temperature controlled zones. The step of controlling the refrigerant mass flow may comprise: providing a variable speed compression device; and selectively varying an operating speed of the variable speed compression device in response to a sum of the respective temperature differentials between a sensed temperature and a related set point temperature associated with each respective zone of the plurality of temperature controlled zones.

The step of determining a desired operating speed of the variable speed compression device may comprise processing the respective temperature differentials through a PI controller with anti-windup. The PI controller may include an integral time tuning parameter that is a zone volume weighted average of a set of the respective integral time tuning parameters associated with each of the plurality of temperature controlled zones.

The step of selectively dividing the refrigerant mass flow amongst the plurality of temperature controlled zones may comprise dividing the refrigerant mass flow amongst the plurality of temperature controlled zones selectively in response to a set point temperature associated with each respective zone of the plurality of temperature controlled zones. In an embodiment, the temperature controlled zone having the lowest set point temperature is designated to receive a largest portion of the refrigerant mass flow. In an embodiment, one temperature controlled zone is manually designated to receive the largest portion of the refrigerant mass flow.

In an aspect of the invention, a refrigeration system is provide that includes a cargo space having a plurality of temperature controlled zones, a refrigerant vapor compression system and a system control. The refrigerant vapor compression system has a refrigerant circuit including a compression device for circulating a refrigerant mass flow through the refrigerant circuit, a plurality of evaporators with at least one evaporator associated with each one of the plurality of temperature controlled zones a first evaporator through which a flow of air circulated from the associated one of the plurality of temperature controlled zones is passed in heat exchange relationship with a portion of the refrigerant mass flow, and a plurality of liquid flow control valves with one liquid flow control valve disposed the refrigerant circuit in operative association with each of the plurality of evaporators for regulating the flow of refrigerant therethrough. The system control controls the refrigerant mass flow output of the compression device to provide a cooling capacity of the refrigerant vapor compression system in response to a collective cooling demand for the plurality of temperature controlled zones and also selectively divides the refrigerant mass flow amongst the plurality of temperature controlled zones.

In an aspect of the invention, a transport refrigeration system is provided that includes a cargo space having a first compartment defining a first temperature controlled zone and a second compartment defining a second temperature controlled zone; a refrigerant vapor compression system and a system control. The refrigerant vapor compression system has a refrigerant circuit including a variable capacity compression device for circulating a refrigerant mass flow through the refrigerant circuit, a first evaporator through which a flow of air circulated from the first temperature controlled zone is passed in heat exchange relationship with a first portion of the refrigerant mass flow, a second evaporator through which a flow of air circulated from the second temperature controlled zone is passed in heat exchange relationship with a second portion of the refrigerant mass flow, a first liquid flow control valve disposed in the refrigerant circuit for regulating the flow of refrigerant through the first evaporator and a second liquid flow control valve disposed in the refrigerant circuit for regulating the flow of refrigerant through the second evaporator. The system control controls the refrigerant mass flow output of the compression device to provide a cooling capacity of the refrigerant vapor compression system in response to a collective cooling demand for the first and the second temperature controlled zones, and selectively controls the positioning of the first liquid flow control valve to control the mass flow of the first portion of the refrigerant mass flow passing to the first evaporator, and selectively controls the positioning of the second liquid flow control valve to control the mass flow of the second portion of the refrigerant mass flow passing to the second evaporator.

In an embodiment, the variable capacity compression device comprises a variable speed compressor. The variable speed compressor may be driven by a variable speed drive motor to which electric current is supplied at a desired operating frequency by a variable frequency drive in response to an operating frequency signal from the system control.

In an embodiment, each of the first and second liquid flow control valves comprises a two position solenoid valve having a fully open position and a fully closed position. Each of the first and second solenoid valves may be pulse width modulated between the fully open position and the fully closed position.

BRIEF DESCRIPTION OF THE DRAWINGS

For a further understanding of the invention, reference will be made to the following detailed description of the invention which is to be read in connection with the accompanying drawing, where.

DETAILED DESCRIPTION OF THE INVENTION

Figure 1:
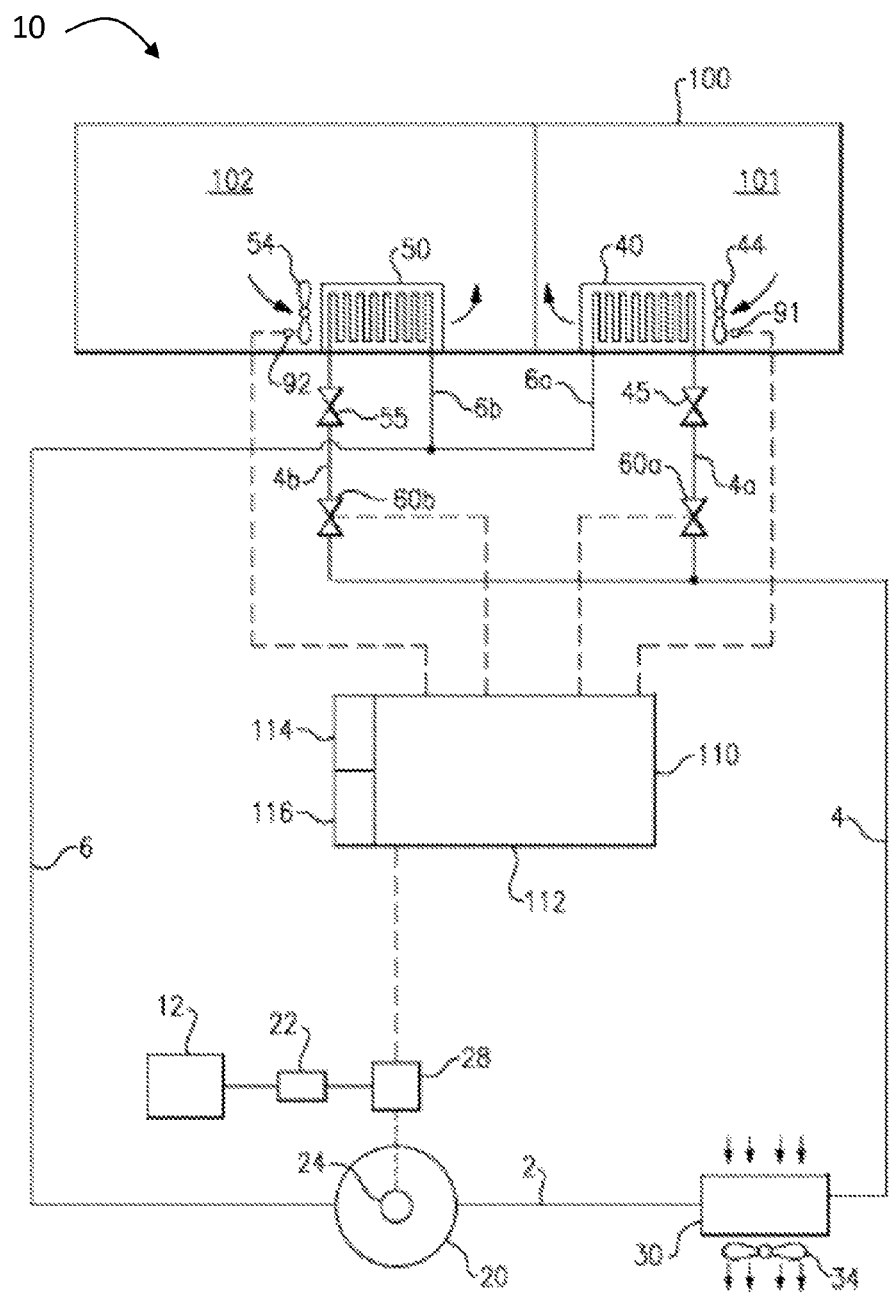
FIG. 1 is a schematic diagram of an exemplary embodiment of a refrigerant vapor compression system associated with a two temperature controlled zones.

Referring initially to FIG. 1, there are depicted an exemplary embodiment of a transport refrigeration system that includes a refrigerant vapor compression system 10 for providing the cooling capacity to chill the air within a two-compartment refrigerated cargo space 100 of a truck, a trailer, a container or the like. The cargo space 100 is divided into two separate and independent temperature controlled zones 101, 102 which may be chilled to different set point temperatures, whereby two different products may be shipped simultaneously. For example, compartment 101 might house a perishable food product and be chilled to a box temperature above 0° C. (32° F.), while compartment 102 might house a frozen product and be chilled to a box temperature below 0° C. (32° F.). Although in the exemplary embodiment depicted in FIG. 1 the cargo space 100 is divided into two compartments, that is two separate and independent temperature-controlled zones; those skilled in the art will understand that the refrigerant vapor compression system 10 may be readily adapted for use in connection with three or more separate and independent temperature controlled zones.

Referring now to FIG. 1, the refrigerant vapor compression system 10 includes a refrigerant vapor compression device 20, a refrigerant heat rejection heat exchanger 30, a first refrigerant evaporator 40 and a first expansion device 45 operatively associated with the first refrigerant evaporator 40, a second refrigerant evaporator 50 and a second expansion device 55 operatively associated with the second evaporator, interconnected by refrigerant lines in a closed refrigerant circuit and arranged in a conventional known refrigerant vapor compression cycle. Refrigerant line 2 connects the discharge outlet of the compression device 20 in refrigerant flow communication with the refrigerant inlet to the refrigerant heat rejection heat exchanger 30. Refrigerant line 4 connects the refrigerant outlet from the refrigerant heat rejection heat exchanger in refrigerant flow communication to refrigerant inlets to the first evaporator and the second evaporator via branch lines 4a and 4b, respectively. Branch lines 6a and 6b connect the refrigerant outlets of the first evaporator 40 and the second evaporator 50, respectively to refrigerant line 6 which connects in refrigerant flow communication to the suction inlet of the compression device 20.

The refrigerant vapor compression system 20 may operate in a subcritical refrigerant cycle and be charged with a relatively high critical temperature refrigerant such as, but not limited to, hydrochlorofluorocarbons (HCFCs), such as R22, and more commonly hydrofluorocarbons (HFCs), such as R134a, R410A, R404A and R407C. In refrigerant vapor compression systems operating in a subcritical cycle, the refrigerant heat rejection heat exchanger 30 functions as a refrigerant vapor condenser and the condenser 30, as well as both of the evaporators 40, 50, operate at refrigerant temperatures and pressures below the refrigerant's critical point.

Alternatively, the refrigerant vapor compression system 20 may be charged with a relatively low critical temperature refrigerant such as carbon dioxide. Because carbon dioxide has a low critical temperature, most refrigerant vapor compression systems charged with carbon dioxide as the refrigerant are designed for operation in the transcritical pressure regime. In refrigerant vapor compression systems operating in a transcritical cycle, the refrigerant heat rejection heat exchanger 30 functions as a gas cooler rather than a condenser and operates at a refrigerant temperature and pressure in excess of the refrigerant's critical point, while the evaporators 40 and 50 operate at a refrigerant temperature and pressure in the subcritical range.

The compression device 20 comprises a variable capacity compression device such as a variable speed compression device. In the exemplary embodiment of the refrigerant vapor compression system 20 depicted in FIG. 1, the compression device comprises a single compressor such as, for example, a single stage or multi-stage reciprocating or rotary compressor, hermetic or open, or a scroll compressor. However, it is to be understood that the compression device 20 is not limited to a single compressor embodiment, but may comprise multiple compressors disposed in a series arrangement or a parallel arrangement or a mixed parallel and series arrangement.

The compression device 20 is driven by a drive motor 24 operatively associated with the compression device 20 and supplied with AC electric current from a power source through a variable frequency drive 28. The capacity of the compression device 20 is controlled by varying the speed at which the compression device operates by varying the frequency of AC electric current supplied to the drive motor 24. The variable frequency drive 28, which may comprise an inverter, receives electric current at line frequency, typically 50, 55 or 60 Hertz, selectively alters that frequency, and outputs the AC current to the drive motor at the selected frequency. In the transport refrigeration application described herein, the power source comprises an electric current generator 22 driven by an internal combustion engine 12, such as the engine of the truck or trailer tractor associated with the cargo space 100 or a separate internal combustion engine dedicated to driving the electric current generator 22.

The refrigerant vapor compression system 20 further includes a first liquid flow control valve 60a and a second liquid control valve 60b. The first liquid flow control valve 60a is disposed in refrigerant branch line 4a upstream with respect to refrigerant flow of the first expansion device 45. The second liquid flow control valve 60 b is disposed in refrigerant branch line 4b upstream with respect to refrigerant flow of the second expansion device 55. In the exemplary embodiment of the refrigerant vapor compression system 20 described herein, each of the first and second flow control valves 60a, 60b comprise two-position solenoid valves having an open position and a closed position and being selectively positionable in the open position to permit unrestricted flow therethrough, in the closed position to prevent flow therethrough, and being selectively pulse width modulated between the open and closed positions to provide restricted flow therethrough, that is flow at a percentage of the open position flow. However, it is to be understood that the flow control valves 60a, 60b may alternatively comprise flow control valves that a selectively positionable at any desired flow opening between fully closed and fully open.

The refrigerant vapor compression system 10 further includes a system control 110, such as a microprocessor controller having a central processing unit (CPU) 112, a memory bank 114 and an input/output interface 116. The system controller 110 maintains a desired temperature environment in the cargo space by selectively controlling the operation of the compressor 20, the condenser fan(s) 34 associated with the condenser heat exchanger coil 32, the evaporator fan(s) 44 associated with the first evaporator 40, the evaporator fan 54 associated with the second evaporator 50, and the opening and closing of both of the first liquid flow control valve 60a associated with the first evaporator 40 and the second liquid flow control valve 60b associated with the second evaporator 50. For example, when cooling of the environment within the cargo space is required, the system controller 110 controls AC electrical current from the current generator 22 (or an external AC power supply) to the compressor drive motor 24 through the variable frequency drive 28 to activate the drive motor 22 and power the compressor 20 at a desired operating speed. The current generator (or an external power supply) also supplies the electric current for powering the motors associated with the condenser fan(s) 34 and the evaporator fan(s) 44.

To facilitate control of the refrigerant vapor compression system 10, the controller 110 also monitors operating parameters at various points in the refrigeration system through a plurality of temperature sensors and pressure transducers, not shown, as in conventional practice, such as but not limited to: an ambient air temperature sensor, a compressor suction pressure transducer, a compressor suction temperature sensor, a compressor discharge pressure transducer, and a compressor discharge temperature sensor. The controller 110 also monitors a return air sensor 91 that senses the temperature of the return air flow, RAT1, passing from the first compartment 101 into the first evaporator 40. The return air temperature, RAT1, is indicative of the temperature within the first temperature controlled zone, typically referred to as the box temperature, defined within the first compartment 101. The controller 110 also monitors a return air sensor 92 that senses the temperature of the return air flow, RAT2, passing from the second compartment 102 into the second evaporator 50. The return air temperature, RAT2, is indicative of the temperature within the second temperature controlled zone, typically referred to as the box temperature, defined within the second compartment 102.

The system control 110 controls the refrigerant mass flow through the refrigerant circuit to provide a cooling capacity of the refrigerant vapor compression system 10 in response to a collective cooling demand for the plurality of temperature controlled zones defined within the cargo space 100, and selectively dividing the refrigerant mass flow amongst the plurality of temperature controlled zones. With reference to the particular embodiment of the refrigerant vapor compression system 10 of FIG. 1 having a two-compartment cargo space 100, the system control 100 estimates the cooling demand of each respective zone of the two temperature controlled zones defined within the compartments 101, 102 as a function of a difference between a sensed return air temperatures RAT1, RAT2 and a related set point temperatures, RAT1SP and RAT2SP, associated respectively with the desired box temperatures for the temperature controlled zone defined within the first compartment 101 and the second temperature controlled zone defined within the second compartment 102. The set point temperatures RAT1SP, RAT2SP represent the estimated return air temperatures that would indicate that the desired the product storage temperatures for the particular products housed within the first compartment 101 and the second compartment 102, respectively, are being maintained under the current ambient conditions. The step of controlling the refrigerant mass flow may comprise: providing a variable speed compression device; and selectively varying an operating speed of the variable speed compression device in response to a sum of the respective temperature differentials between a sensed temperature and a related set point temperature associated with each respective zone of the plurality of temperature controlled zones. For example, first compartment 101 might house a perishable food product and be chilled to a box temperature above 0° C. (32° F.), such as about 4° C. (about 40° F.) or higher, while the second compartment 102 might house a frozen product and be chilled to a box temperature below 0° C. (32° F.), such as about −20° C. (about −4° F.) or lower.

Figure 2:
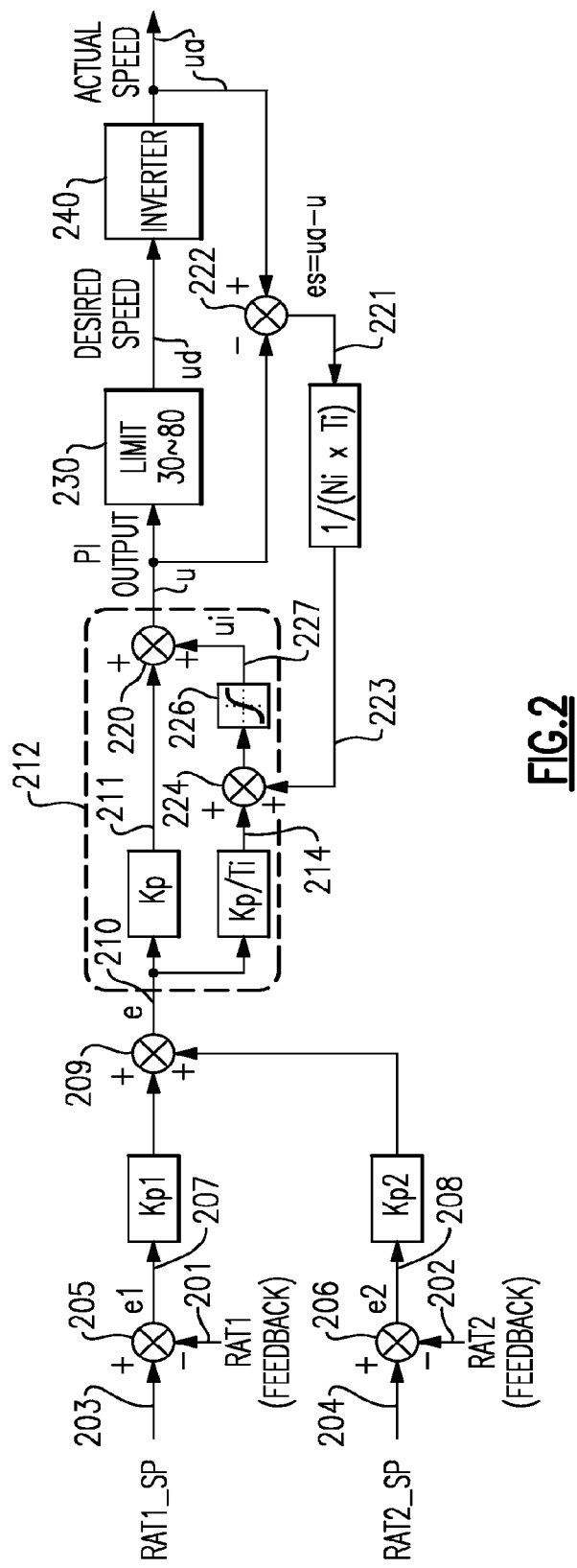
FIG. 2 is a block diagram of an exemplary embodiment of a PI control process for determining the desired speed of the compression device.
Figure 5:
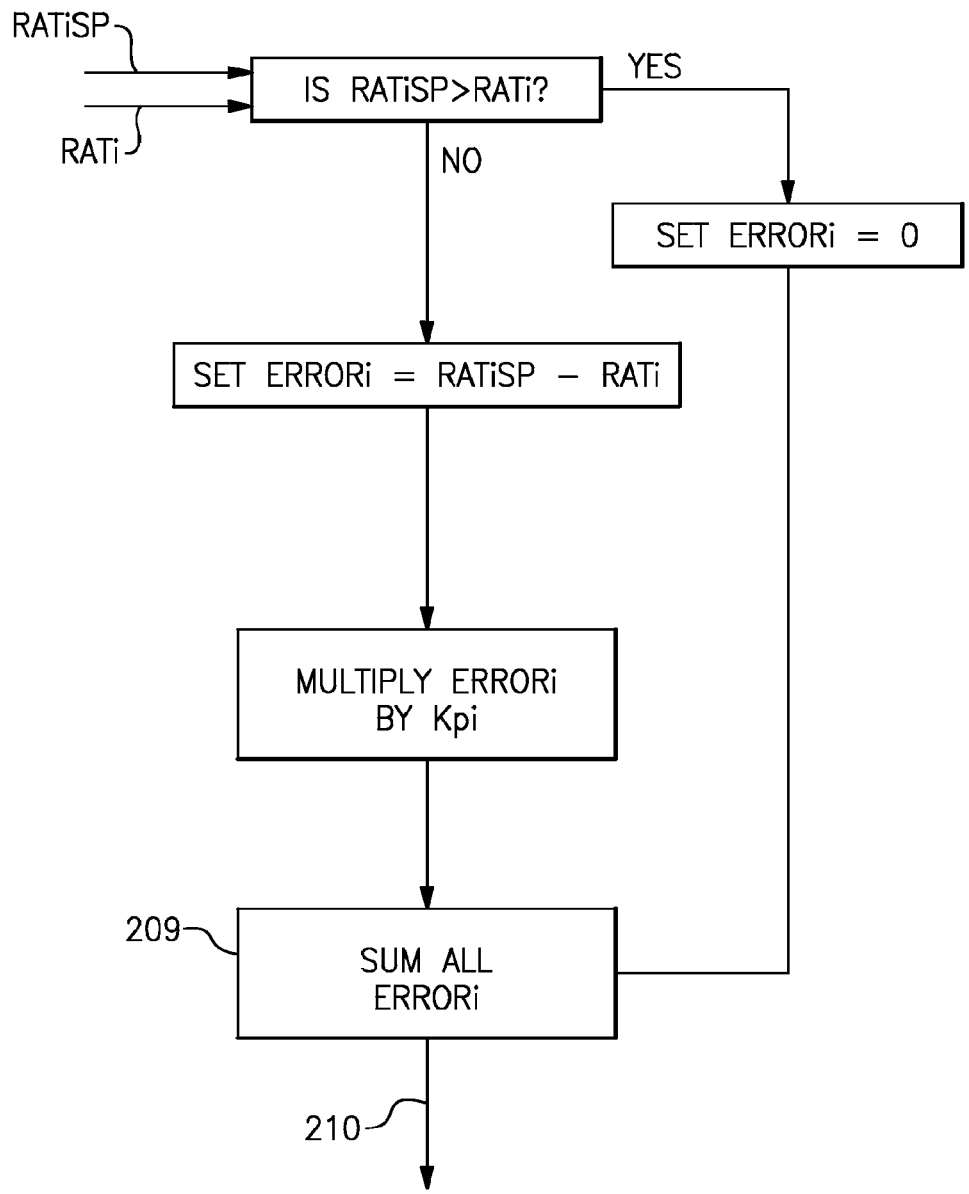
FIG. 5 is a process flow diagram illustrating a procedure for generating an overall system temperature error for a system with two or more separate temperature controlled zones.

In the exemplary embodiment of the refrigerant vapor compression system depicted in FIG. 1, the compression device 20 is a variable speed compressor and the system controller 110 controls the cooling capacity of the refrigerant vapor compression system 10 by varying the operating speed of the compressor 20 in response to the collective cooling demand. In determining the desired operating speed, the system control may process the respective sensed temperature data, RAT1 and RAT2, and the set point temperatures, RAT1SP and RAT2SP, through a PI control routine, such as shown in FIG. 2. As depicted therein, for each temperature controlled zone, signals 201, 202 indicative of the sensed return air temperature RAT1, RAT2 is added as a negative feedback to a signal 203, 204 indicative of the associated set point temperature RAT1SP and RAT2SP at summators 205, 206, respectively to generate temperature error signals 207, 208. The sign of the estimate of the cooling requirement of each box is preserved by clipping the individual error signals 207 and 208 to a value of 0 whenever RAT1SP is greater than RAT1 or RAT2SP is greater than RAT2, respectively. The individual temperature error signals 207, 208 are then multiplied by tuning constants $K_p1$ $K_p2$, respectively, and then added at summator 209 to generate a system temperature error signal 210. This procedure for generating an overall system temperature error 210 for a system with two or more separate temperature controlled zones is illustrated as a process flow chart in FIG. 5.

The temperature error signal 210 is then processed through a PI controller 212 wherein the temperature error is multiplied by a proportional parameter, $K_p$, which has a default value of 1, to provide a proportional term signal 211 and multiplied by an integral time tuning parameter, $K_p/T_i$, to provide an integral term signal 214 that, after further processing as indicated in FIG. 2, to yield a modified integral term signal 227 is added to the proportional term signal 211 at summator 220 to provide an output frequency signal, u. The output frequency signal u is then passed through a limit circuit 230. If the output frequency signal u falls between a low limit, for example at least 30 hertz, and a high limit, for example not more than 80 hertz, the limit circuit 230 simply outputs the received frequency signal to the inverter circuit 240 of the variable frequency drive 28 as the desired speed frequency signal, $u_d$. However, if the output frequency signal u is less than then low limit or greater than the high limit, the limit circuit 230 adjusts the output frequency signal to the low limit or the high limit, respectively, and outputs that limited frequency signal to the inverter circuit 240 of the variable frequency drive 28 as the desired speed frequency signal, $u_d$.

The variable frequency drive 28 alters the frequency of the current supplied via the generator 22 to match the desired speed frequency signal, $u_d$, and passes the electric current now at the altered frequency, $u_a$, to the drive motor 24 for driving the compressor 20 at an operating speed commensurate with the desired speed frequency signal, $u_d$. If the inverter circuit 240 senses that the engine driving the generator 28 is running at a low revolutions per minute, rpm, such as at idle, that the generator will be incapable of generating adequate electric current at the desired speed frequency signal, $u_d$, the inverter circuit will limit the desired speed frequency signal according to a reduced frequency level that the engine can support at its low rpm until the engine has resumed higher rpm operation.

As depicted in FIG. 2, the PI controller 212 may be provided with anti-windup feature. The anti-windup feature includes a feedback loop wherein a speed error signal 221, generated at summator 222 by subtracting the frequency signal u output from the PI controller 240 from the actual frequency, $u_a$, output from the inverter circuit 240, is multiplied by an anti-windup tuning parameter, $1/(N_i \times T_i)$, to produce a modified error signal 223. The integral term signal 214 of PI controller 212 is modified at summator 224 to add the error signal 223 thereto. The integral term so modified is then passed through integrator 226 and the further modified integral term signal 227 is added to the proportional term signal 211 to provide the PI output frequency, u, which is passed as input to the limiter 230.

The integral time tuning parameter, $T_i$, is a zone volume weighted average of a set of the respective integral time tuning parameters associated with each of the plurality of temperature controlled zones and defined by the formula:

$$T_i = (BV_1 \times T_{i1} + BV_2 \times T_{i2})/(BV_1 + BV_2),$$

where $BV_1$ is the volume of the first compartment, $BV_2$ is the volume of the second compartment, $T_{i1}$ is an integral time tuning parameter associated with the first compartment and $T_{i2}$ is an integral time tuning parameter associated with the second compartment. Ni is an anti-windup tuning parameter that typically has a value of about 0.9. Those skilled in the art will appreciated that each set of tuning parameters [$K_{p1}T_{i1}$] and [$K_{p2}, T_{i2}$] may be computed using conventional control tuning rules and identified plant transfer function for the particular compartment.

Figure 3:
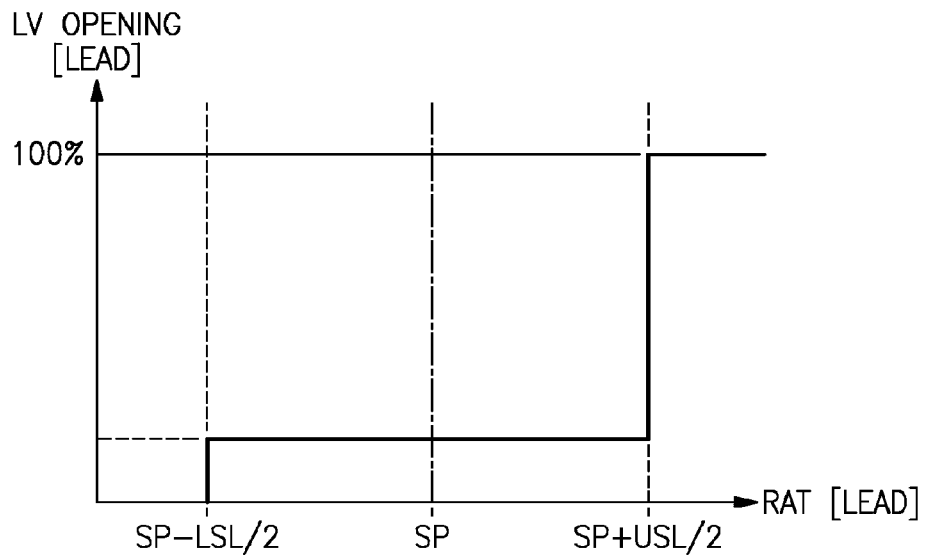
FIG. 3 is a graphical illustration presenting an exemplary approach for controlling positioning of a lead liquid flow control valve.

The system control 110 also selectively divides the refrigerant mass flow amongst the respective temperature controlled zones defined by the compartments 101, 102. When the compressor 20 is running, the system control 110 ensures that at least one of the liquid control valves 60a, 60b is in a full open position. In an automatic mode for dividing refrigerant mass flow in a two-compartment cargo arrangement between the first evaporator 40 and the second evaporator 50, the system control identifies the compartment that has the lowest return air temperature set point is referred to as the Lag compartment and the other compartment is referred to as the Lead compartment. If only one compartment is in a cooling mode, the system control 110 will designate that compartment as the Lag compartment. In dividing the refrigerant mass flow in this automatic control mode, the system control 110 will position the respective one of the flow control valves 60a, 60b associated with the Lag compartment in a full open position. The system control 110 will then open the other of the flow control valves 60a, 60b which is associated with the Lead compartment to the equivalent of about 17% of full open, although any other value less than 100% full open may be used, unless the sensed return air temperature for the Lead compartment is at or above a temperature value equal to the set point return air temperature for that compartment plus one-half of a designated upper set point deviation limit. The afore-discussed control is illustrated graphically in FIG. 3.

The division of the refrigerant mass flow between two or more compartments by the system control 110 may also be governed by manually designating a particular compartment as the priority compartment whenever the compartment is in a cooling mode. In such case, the system controller 110 will always designate that manually selected compartment as the Lag compartment whenever that compartment is in the cooling mode, and will designate the other compartment or each of the other compartments as a Lead compartment. As in the automatic mode, in dividing the refrigerant mass flow in the manual control mode, the system control 110 will position the respective one of the flow control valves associated with the Lag compartment in a full open position. The system control 110 will then position the flow control valve(s) associated with the Lead compartment(s) in an equivalent of a percent full open position, $Opening_{Lead}$ as a function of the sensed return air temperature ($RAT_{lag}$) associated with the Lag compartment and its associated return air temperature set point (SP) and an associated upper set point temperature deviation limit (USL) and lower set point temperature deviation limit (LSL) according to the following relationship:

$$Opening_{Lead} = 17\% + \left( \frac{\left(SP + \frac{USL}{2}\right) - RAT_{Lag}}{\frac{USL}{2} + \frac{LSL}{2}} \times 83\% \right).$$

Figure 4:
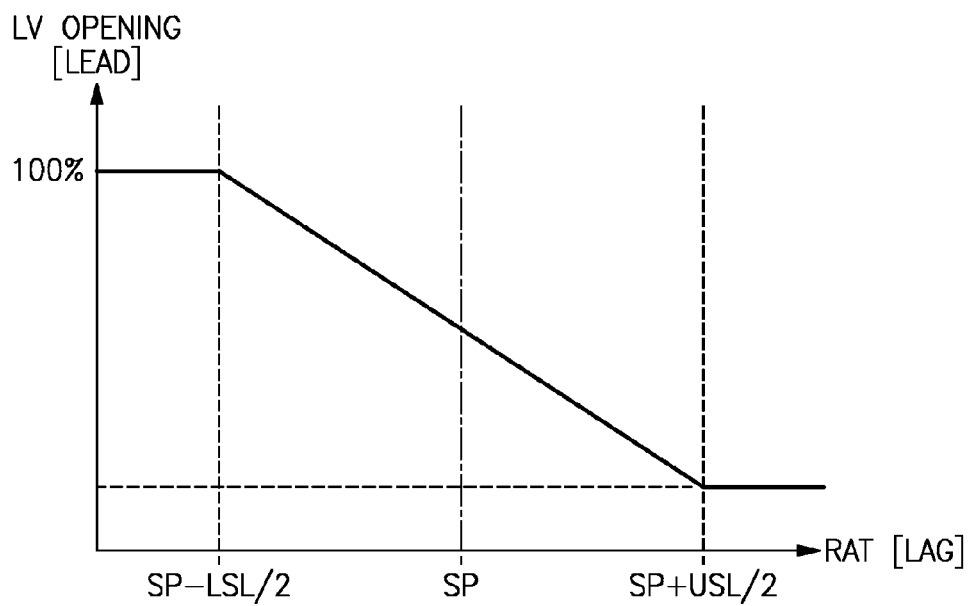
FIG. 4 is a graphical illustration presenting another exemplary approach for controlling positioning of a lead liquid flow control valve.

The control logic for the opening of the flow control valve(s) associated with the Lead compartments(s) in this manual mode where a particular compartment is manually selected as the priority compartment is illustrated graphically in FIG. 4.

While the flow control valves 60a, 60b may comprise solenoid valves that are continuously positionable or selectively positionable at multiple openings between a fully closed position and a fully open position, in an embodiment the flow control valves 60a, 60b may comprise two-position solenoid valves having a fully closed position and a fully open position, such as for example a pulse width modulated two-position solenoid valve. In this case, in order to obtain a desired flow through the flow control valve that is equivalent a desired percentage of the flow through the flow control valve it is fully open position, the system control 110 will rapidly modulate the flow control valve between the fully open position and the fully closed position to obtain the desired refrigerant mass flow through the valve.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention.

Therefore, it is intended that the present disclosure not be limited to the particular embodiment(s) disclosed as, but that the disclosure will include all embodiments falling within the scope of the appended claims.

We claim:

1. A method for controlling the operation of a refrigerant vapor compression system for cooling a temperature-controlled space having a plurality of temperature controlled zones, the refrigerant vapor compression system including a refrigerant circuit through which a refrigerant mass flow is circulated by a compression device, said method comprising:
controlling the refrigerant mass flow to provide a cooling capacity of the refrigerant vapor compression system in response to a collective cooling demand for said plurality of temperature controlled zones; each of the plurality of temperature controlled zones including an evaporator; and
selectively dividing the refrigerant mass flow amongst the plurality of temperature controlled zones;
wherein controlling the refrigerant mass flow comprises providing a variable speed compression device; and
selectively varying an operating speed of the variable speed compression device in response to a sum of respective tuned temperature differentials between a sensed temperature and a related set point temperature associated with each respective zone of the plurality of temperature controlled zones, wherein each tuned temperature differential corresponds to a temperature differential between the sensed temperature and the related set point temperature associated with each respective zone of the plurality of temperature controlled zones multiplied by a respective tuning constant.

2. The method for controlling the operation of a refrigerant vapor compression system as recited in claim 1, further comprising determining a desired operating speed of the variable speed compression device by processing the respective temperature differentials through a PI controller with an anti-windup feature.

3. The method for controlling the operation of a refrigerant vapor compression system as recited in claim 2, wherein the PI controller includes an integral time tuning parameter that is a zone volume weighted average of a set of the respective integral time tuning parameters associated with each of the plurality of temperature controlled zones.

4. The method for controlling the operation of a refrigerant vapor compression system as recited in claim 1, wherein selectively dividing the refrigerant mass flow amongst the plurality of temperature controlled zones comprises dividing the refrigerant mass flow amongst the plurality of temperature controlled zones selectively in response to a set point temperature associated with each respective zone of the plurality of temperature controlled zones.

5. The method for controlling the operation of a refrigerant vapor compression system as recited in claim 4, wherein the temperature controlled zone having the lowest set point temperature is designated to receive a largest portion of the refrigerant mass flow.

6. The method for controlling the operation of a refrigerant vapor compression system as recited in claim 4, wherein one of the temperature controlled zones having the lowest set point temperature is manually designated to receive a largest portion of the refrigerant mass flow.

7. A transport refrigeration system comprising:
a cargo space having a first compartment defining a first temperature controlled zone and a second compartment defining a second temperature controlled zone;
a refrigerant vapor compression system having a refrigerant circuit including a variable capacity compression device for circulating a refrigerant mass flow through the refrigerant circuit, a first evaporator through which a flow air circulated from the first temperature controlled zone is passed in heat exchange relationship with a first portion of the refrigerant mass flow, a second evaporator through which a flow of air circulated from the second temperature controlled zone is passed in heat exchange relationship with a second portion of the refrigerant mass flow, a first liquid flow control valve disposed in the refrigerant circuit for regulating flow of refrigerant through the first evaporator and a second liquid flow control valve disposed in the refrigerant circuit for regulating the flow of refrigerant through the second evaporator; and
a system control for controlling the refrigerant mass flow output of the compression device to provide a cooling capacity of the refrigerant vapor compression system in response to a collective cooling demand for the first and the second temperature controlled zones, and for selectively controlling the positioning of the first liquid flow control valve to control the mass flow of the first portion of the refrigerant mass flow passing to the first evaporator, and for selectively controlling the positioning of the second liquid flow control valve to control the mass flow of the second portion of the refrigerant mass flow passing to the second evaporator;

wherein the variable capacity compression device comprises a variable speed compressor; and wherein the system control selectively varies an operating speed of the variable speed compression device in response to a sum of (i) a first tuned temperature differential corresponding to a first temperature differential between a first sensed temperature at the first temperature controlled zone and a first set point temperature multiplied by a first tuning constant and (ii) a second tuned temperature differential corresponding to a second temperature differential between a second sensed temperature at the second temperature controlled zone and a second set point temperature multiplied by a second tuning constant.

8. The transport refrigeration system as recited in claim 7 further comprising:
- a variable speed drive motor for driving the variable speed compressor at a desired operating speed; and
- a variable frequency drive operatively associated with the system control and the variable speed motor for delivering electric current to the variable speed drive motor at a desired frequency in response to a frequency signal from the system control.

9. The transport refrigeration system as recited in claim 7 wherein each of the first and second liquid flow control valves comprises a two position solenoid valve having a fully open position and a fully closed position.

10. The transport refrigeration system as recited in claim 9 wherein each of the first and second solenoid valves may be pulse width modulated between the fully open position and the fully closed position.

* * * * *